United States Patent
Sung et al.

(10) Patent No.: US 8,099,103 B2
(45) Date of Patent: Jan. 17, 2012

(54) METHOD FOR LOCATING MOBILE TERMINALS

(75) Inventors: Sang-Kyung Sung, Suwon-si (KR); Wuk Kim, Gwacheon-si (KR); Joo-Young Kim, Suwon-si (KR); Joon-Goo Park, Yongin-si (KR); Jong-Hoon Ann, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/044,851

(22) Filed: Jan. 27, 2005

(65) Prior Publication Data

US 2011/0136500 A1   Jun. 9, 2011

(30) Foreign Application Priority Data

Jan. 31, 2004 (KR) .................. 10-2004-0006480

(51) Int. Cl.
*H04W 24/00* (2009.01)
(52) U.S. Cl. ................... 455/456.1; 455/456.2
(58) Field of Classification Search ............. 455/456.1, 455/456.2, 456.3
See application file for complete search history.

(56) References Cited

U.S. PATENT DOCUMENTS

| | | | |
|---|---|---|---|
| 6,101,387 A * | 8/2000 | Granberg et al. | 455/433 |
| 6,411,811 B2 | 6/2002 | Kingdon et al. | |
| 6,675,011 B1 * | 1/2004 | Kita | 455/422.1 |
| 7,031,722 B2 * | 4/2006 | Naghian | 455/456.1 |
| 7,068,634 B2 * | 6/2006 | Vanttinen | 370/338 |
| 7,072,651 B2 * | 7/2006 | Jiang et al. | 455/432.1 |
| 7,151,941 B2 * | 12/2006 | Vanttinen et al. | 455/456.2 |
| 2002/0094822 A1 | 7/2002 | Anctil et al. | |
| 2003/0186699 A1 * | 10/2003 | Havlark et al. | 455/440 |
| 2004/0203915 A1 * | 10/2004 | van Diggelen et al. | 455/456.1 |
| 2005/0118999 A1 * | 6/2005 | Zhu | 455/432.1 |
| 2006/0135174 A1 * | 6/2006 | Kraufvelin et al. | 455/456.1 |

FOREIGN PATENT DOCUMENTS

EP   1 298 448   4/2003

(Continued)

OTHER PUBLICATIONS

Universal Mobile Telecommunications System (UMTS; User Equipment (UE) Positioning in Universal Terrestrial Radio Access Network (UTRAN); Stage 2.

(Continued)

*Primary Examiner* — Nghi H Ly
*Assistant Examiner* — Amancio Gonzalez
(74) *Attorney, Agent, or Firm* — The Farrell Law Firm, P.C.

(57) ABSTRACT

A method for locating mobile terminals is provided. First, information of a home Public Land Mobile Network (PLMN) of a target mobile terminal, the location of which is to be determined, is checked in response to a location service request from a client. Then, information of a visited PLMN, where the target mobile terminal is currently located, is checked based on the checked information of the home PLMN. The home PLMN calculates location assistance information of the visited PLMN using specific location information of the visited PLMN. The location assistance information is transferred to the target mobile terminal. This allows location information of a mobile terminal to be obtained irrespective of the area or communication network where the mobile terminal is located. It is thus possible to locate a mobile terminal in an area where no location assistance information is provided.

24 Claims, 10 Drawing Sheets

FOREIGN PATENT DOCUMENTS

| | | |
|---|---|---|
| EP | 1 337 123 | 8/2003 |
| EP | 1 370 095 | 12/2003 |
| EP | 1 376 151 | 1/2004 |
| JP | 2002-351767 | 12/2002 |
| JP | 2003-235070 | 8/2003 |
| RU | 2 139 631 | 3/1993 |
| WO | WO 99/54753 | 10/1999 |
| WO | WO 01/52569 | 7/2001 |
| WO | WO 02/03718 | 1/2002 |
| WO | WO 03/045084 | 5/2003 |

OTHER PUBLICATIONS (3GPP TS 25.305 Version 5.5.0 Release 5); ETSI TS 125 305, Mar. 1, 2003.

* cited by examiner

| LCS SESSION REQUEST FLAG (511) | SOURCE IP ADDRESS (512) | DESTINATION IP ADDRESS (513) | CLIENT ID (514) | LOCATION CALCULATION TYPE (515) | LOCATION ASSISTANCE INFORMATION (516) |
|---|---|---|---|---|---|

| LCS RESPONSE FLAG (521) | SOURCE IP ADDRESS (522) | DESTINATION IP ADDRESS (523) | CLIENT ID (524) | LOCATION CALCULATION TYPE (525) | GPS PSEUDORANGE OF UE_A (526) |
|---|---|---|---|---|---|

| LCS RESPONSE FLAG (531) | SOURCE IP ADDRESS (532) | DESTINATION IP ADDRESS (533) | CLIENT ID (534) | LOCATION CALCULATION TYPE (535) | GPS LOCATION INFORMATION OF UE_A (536) |
|---|---|---|---|---|---|

610

| LCS SESSION REQUEST FLAG (611) | ID OF UE_A (612) | CELL ID (613) | 14 LOCATION CALCULATION TYPE (614) | LOCATION QoS (615) | EXPIRATION TIME (616) |
|---|---|---|---|---|---|

| SOURCE (HOME GMLC) IP ADDRESS (621) | DESTINATION (UE_A) IP ADDRESS (622) | LOCATION CALCULATION TYPE (623) | LOCATION ASSISTANCE INFORMATION (624) |
|---|---|---|---|

| SOURCE (UE_A) IP ADDRESS (631) | DESTINATION (HOME GMLC) IP ADDRESS (632) | LOCATION CALCULATION TYPE (633) | GPS PSEUDORANGE OF UE_A (634) |
|---|---|---|---|

| SOURCE (HOME GMLC) IP ADDRESS (641) | DESTINATION (UE_A) IP ADDRESS (642) | LOCATION CALCULATION TYPE (643) | LOCATION INFORMATION OF UE_A (644) |
|---|---|---|---|

| SOURCE (UE_A) IP ADDRESS (651) | DESTINATION (HOME GMLC) IP ADDRESS (652) | LOCATION CALCULATION TYPE (653) | LOCATION INFORMATION OF UE_A (654) |
|---|---|---|---|

FIG.9E

METHOD FOR LOCATING MOBILE
TERMINALS

PRIORITY

This application claims priority to an application entitled "METHOD FOR LOCATING MOBILE TERMINALS", filed in the Korean Intellectual Property Office on Jan. 31, 2004 and assigned Serial No. 2004-0006480, the contents of which are incorporated herein by reference.

BACKGROUND OF THE INVENTION

1. Field of the Invention

The present invention relates to a method for locating mobile terminals, and more particularly to a method for locating mobile terminals located in an area where GPS assistance information required for location determination is not provided.

2. Description of the Related Art

As mobile terminals have become smaller, lighter, and more simple to use and mobile communication devices and their networks have spread worldwide, users of mobile communication services carry their mobile terminals and receive mobile communication services in addition to other services through their mobile terminals even when they travel. In the environment of a global system for mobile communications, many users also desire to receive application services (e.g., information on traffic, daily life, news, weather, location, etc.) using location information of their mobile terminals. A system to allow users to obtain their location information using the mobile terminals has been commercialized in some countries, for example, Korean mobile communication areas provided by SK telecom, KTF and the like, or Japanese or Western mobile communication areas of NTT, DoCoMo, Sprint PCS, KDDI, Vodafone and the like.

FIG. 1 is a schematic diagram showing the configuration of a general mobile communication system (particularly, a Global System for Mobile communication (GSM) or a Universal Mobile Telecommunication System (UMTS)). As shown in this figure, the GSM or UMTS includes a Core Network (CN) 110, a plurality of Radio Network Subsystems (RNSs) 120 and 130, and User Equipment (UE) 150.

The CN 110 manages information of UEs 150, and performs mobility management, session management and call management functions.

The RNS 120 or 130, serves to transfer data received from the CN 110 to users via an air interface. To this end, the RNS 120 or 130, includes a Radio Network Controller (RNC), and a plurality of base stations (node B). For example, the RNS 120 includes an RNC 121 and base stations (node B) 123 and 125, and the RNS 130 includes an RNC 131 and base stations (node B) 133 and 135.

The RNC 121 or 131 is classified into a serving RNC (SRNC), a drift RNC (DRNC) and a controlling RNC (CRNC) based on its operation. The SRNC is an RNC that manages information of UEs belonging to the RNC, and handles data transmission between the UEs and the CN 110 via an Iu interface. The DRNC is an RNC that intermediates data transmission between a UE belonging to a different RNC and an RNC (for example, an SRNC) to which the UE belongs. The CRNC is an RNC that controls each of the base stations. For example, in FIG. 1, if the RNC 121 manages the information of the UE 150, the RNC 121 is an SRNC of the UE 150, and if the UE 150 moves and communicates data with the RNC 121 via the RNC 131, the RNC 131 is a DRNC of the UE 150. In addition, the RNC 121, which controls the base station (node B) 125 in communication with the UE 150, is a CRNC of the base station 125. In the example of FIG. 1, information and data of the UE 150 is transmitted and received to and from the CN 110 via the RNC 121 that is an SRNC of the UE 150.

There are various methods which are typically used for locating UEs in the mobile communication network. These methods are generally divided into three types which will be described below.

The first is a cell-based location method in which the location of a UE is determined based on information of a cell located nearest to the UE or based on information of a cell that manages the UE. The second is a network-based location method in which a signal measured between the node B and a UE is used to calculate a Time of Arrival (TOA) or a Time Difference of Arrival (TDOA) based on the intensity of the signal or based on radio wave transfer time thereof and the location of the UE is determined by triangulation using the calculated TOA or TDOA. The third is a GPS-based location method in which the location of a UE is determined using a Global Positioning System (GPS) developed by the US Department of Defense. One particular GPS-based location method, which complements and applies the GPS technology to a mobile communication network, is called Network-Assisted GPS (AGPS).

In the prior art, if a Location Service (LCS) client located external to a network requests location determination of a UE, a preparatory process for locating the UE is first performed, and a signal required to locate the UE is measured, and then the location of the UE is calculated based on the measured signal. In the preparatory process, a privacy indicator for limiting access to personal information or the like of the UE is read, and network resources are allocated, and then a location technique is selected according to the performance of the UE and the network, and quality of Service (QoS) requested by the LCS client. The location measurement process is performed between the Universal Terrestrial Random Access Network (UTRAN) and the UE. In this process, a location measurement signal, including a signal required to measure the location of the UE, is obtained and then the location of the UE is calculated using the location technique selected in the preparatory process. Here, the UE must be an individual UE whose Mobile Subscriber ISDN Number (MSISDN) or International Mobile Subscriber Identity (IMSI) is already known.

The above location measurement process is performed frequently when the UE moves out of a Gateway Mobile Location Center (GMLC), which is registered as a home GMLC of the UE in the CN, and it is thus located in another GMLC or when a location service for locating the UE is requested by an external LCS client or the UE itself. Here, the GMLC manages location information of UEs located in a Public Land Mobile Network (PLMN). The PLMN is a geographically or logically distinguishable mobile communication network, and one PLMN may include one or more GMLCs.

FIG. 2 is a process flow diagram showing a conventional method for locating mobile terminals, particularly when an external LCS client (hereinafter referred to as a "client") 160 requests location determination of a UE_A 155.

As shown in FIG. 2, the client 160 requests a location service (LCS) of a UE, the location of which the client 160 desires to know, from a requesting GMLC 111 connected to the client 160 (S11). That is, the client 160 requests location information of the UE_A 155 from the requesting GMLC 111. The "requesting" GMLC 111 is a GMLC that "requests" location of the UE_A 155.

Then, the requesting GMLC 111 requests home PLMN information of the UE_A 155 from a Home Location Register/Home Subscriber Server (HLR/HSS) 115 (S13), and receives the home PLMN information from the HLR/HSS 115 (S15). As a server storing roaming information and registrant information of UEs, the HLR/HSS 115 responds to the request from the requesting GMLC 111 using the stored registrant information of the UEs. That is, in response to the request from the requesting GMLC 111, the HLR/HSS 115 provides the home PLMN information of the UE_A 155 to the requesting GMLC 111 (S15).

Then, using the home PLMN information of the UE_A 155 received from the HLR/HSS 115 at step S15, the requesting GMLC 111 requests information of a visited PLMN, where the UE_A 155 is currently located, from a home GMLC 113 of the UE_A 155 (S17). In response to the request from the requesting GMLC 111, the home GMLC 113 requests and receives information of the visited PLMN from the HLR/HSS 115 (S21, S23, respectively) after performing authentication for privacy protection (S19). Using the visited PLMN information, the home GMLC 113 requests the location information of the UE_A 155 from a GMLC 117 in the visited PLMN (S25). Since it belongs to the visited PLMN where the UE_A 155 is currently located, the GMLC 117 is referred to as a "visited GMLC".

The location of the UE_A 155 is calculated in the visited GMLC 117 in the PLMN being visited by the UE_A 155, an MSC/SGSN (Mobile-services Switching Center/Serving GPRS (General Packet Radio Service) Support Node) 119, a Radio Access Network (RAN) 170 and the UE_A 155 (S27).

As described above, the mobile communication network generally uses three location methods, i.e., a cell ID-based location method, a TDOA location method, and an A-GPS location method. The PLMN being visited by the UE_A 155 can also use one of the three location methods to measure the location of the UE_A 155. Depending on the burden on network resources or depending on where the location calculation is performed, the conventional location methods described above can be classified into the following two types. The first type is a UE-based location method in which the location of a UE is calculated by the UE itself based on pseudo range information and location assistance information. The second type is a UE-assisted location method in which a UE obtains pseudo range information using GPS assistance information (or A-GPS information) acquired from GPS satellite signals, and it then transfers the pseudo range information to an RNC managing an LCS service of the UE so that the location of the UE is calculated in the network.

In the example of FIG. 2, the request for the location information of the UE_A 155 transferred to the GMLC 117 being visited by the UE_A 155 is transferred to the RAN 170 via the MSC/SGSN 119. In the UE-based location method, a serving RNC of the UE_A 155 transmits its A-GPS information to the UE_A 155 so that the UE_A 155 calculates its own location. In the UE-assisted location method, the UE_A 155 transmits the acquired GPS pseudo range information to an RNC so that the location of the UE_A 155 is calculated in the network.

If the location of the UE_A 155 has been calculated based on one of the UE-based and UE-assisted methods at step S27, the visited GMLC 117 transfers the calculated location information of the UE_A 155 to the home GMLC 113. The home GMLC 113 transfers the location information received from the visited GMLC 117 to the client 160 via the requesting GMLC 111 (S33, S35) after again performing authentication (S31).

However, when an external LCS client or a UE requests a location service of the UE located in a PLMN that includes no location calculation system such as a Location Measurement Unit (LMU) or a Serving Mobile Location Center (SMLC), the conventional methods for locating mobile terminals (i.e., UEs) cannot calculate the location of the UE. That is, if the visited PLMN, where the UE is located, provides no location assistance information, the PLMN returns a failure response to the location measurement request from the UE or the LCS client.

The conventional location methods cannot obtain improved location service results over standalone GPS location measurement in a mobile communication network that provides no basic location service. For example, in the conventional location methods, an LCS client cannot obtain location information of a UE that is traveling to an accident area or is moving to a troubled area, and a UE cannot independently utilize travel or geographical information using an LCS service provided by its home PLMN, and also cannot independently check its location information to use an LCS service database stored in the UE.

SUMMARY OF THE INVENTION

Therefore, the present invention has been made in view of the above problem, and it is an object of the present invention to provide a method for locating mobile terminals, which can obtain location information of a mobile terminal irrespective of the area or communication network where the mobile terminal is located.

It is another object of the present invention to provide a method for locating mobile terminals, which can locate a mobile terminal in an area where no location assistance information is provided.

It is a further object of the present invention to provide a method for locating mobile terminals, in which location assistance information of a target terminal, the location of which is to be determined, is produced based on location information of a home communication network of the target terminal received through a packet network.

It is another object of the present invention to provide a method for locating mobile terminals, which obtains effective and accurate location information.

It is yet another object of the present invention to provide a method for locating mobile terminals, which can provide continuity and integrity of a location service even when the mobile terminal is roaming.

In accordance with one aspect of the present invention, the above and other objects can be accomplished by the provision of a method for locating mobile terminals, including the steps of checking information of a home Public Land Mobile Network (PLMN) of a target mobile terminal, the location of which is to be determined, in response to a location service request from a client for location determination of the target mobile terminal; checking information of a visited PLMN where the target mobile terminal is located, based on the information of the home PLMN; calculating location assistance information of the visited PLMN by the home PLMN using specific location information of the visited PLMN; and transferring the location assistance information to the visited PLMN of the target mobile terminal.

In accordance with another aspect of the present invention, the above and other objects can be accomplished by the provision of a method for locating mobile terminals, including the steps of in a visited PLMN where a target terminal is located, checking information of a home PLMN of the target terminal in response to a location service request of the target terminal; requesting location assistance information by the Serving GPRS (General Packet Radio Service) Support Node (SGSN), required for location calculation of the target terminal, from the home PLMN; calculating, by the home PLMN, the location assistance information of the target terminal located in the visited PLMN using specific location information of the visited PLMN in response to the request at step b); and transferring the location assistance information to the target terminal.

BRIEF DESCRIPTION OF THE DRAWINGS

The above and other objects, features and other advantages of the present invention will be more clearly understood from the following detailed description taken in conjunction with the accompanying drawings, in which:

FIGS. 6A to 6C are diagrams illustrating the format of a message transmitted when the location of a mobile terminal is determined according to the first embodiment of the present invention;

FIGS. 9A to 9E are diagrams illustrating the format of a message transmitted when the location of a mobile terminal is determined according to the second embodiment of the present invention.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention unclear.

Figure 1:
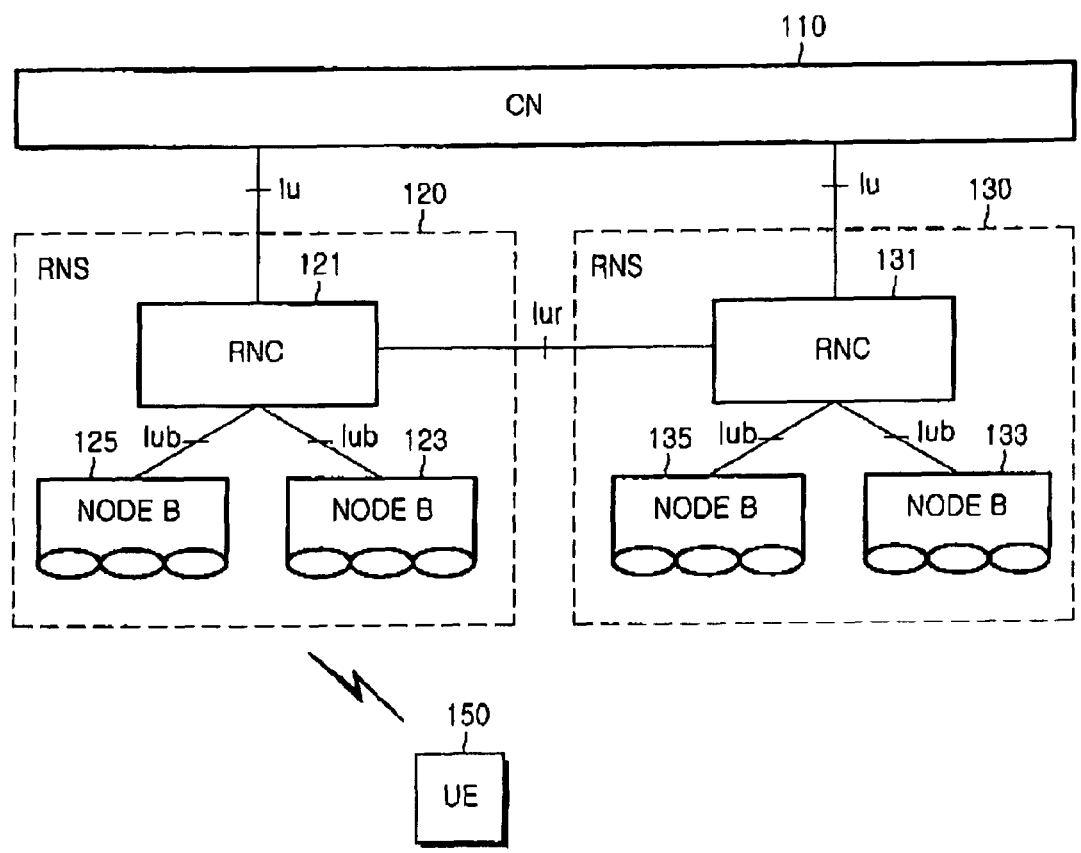
FIG. 1 is a schematic diagram showing the configuration of a general mobile communication system.
Figure 2:
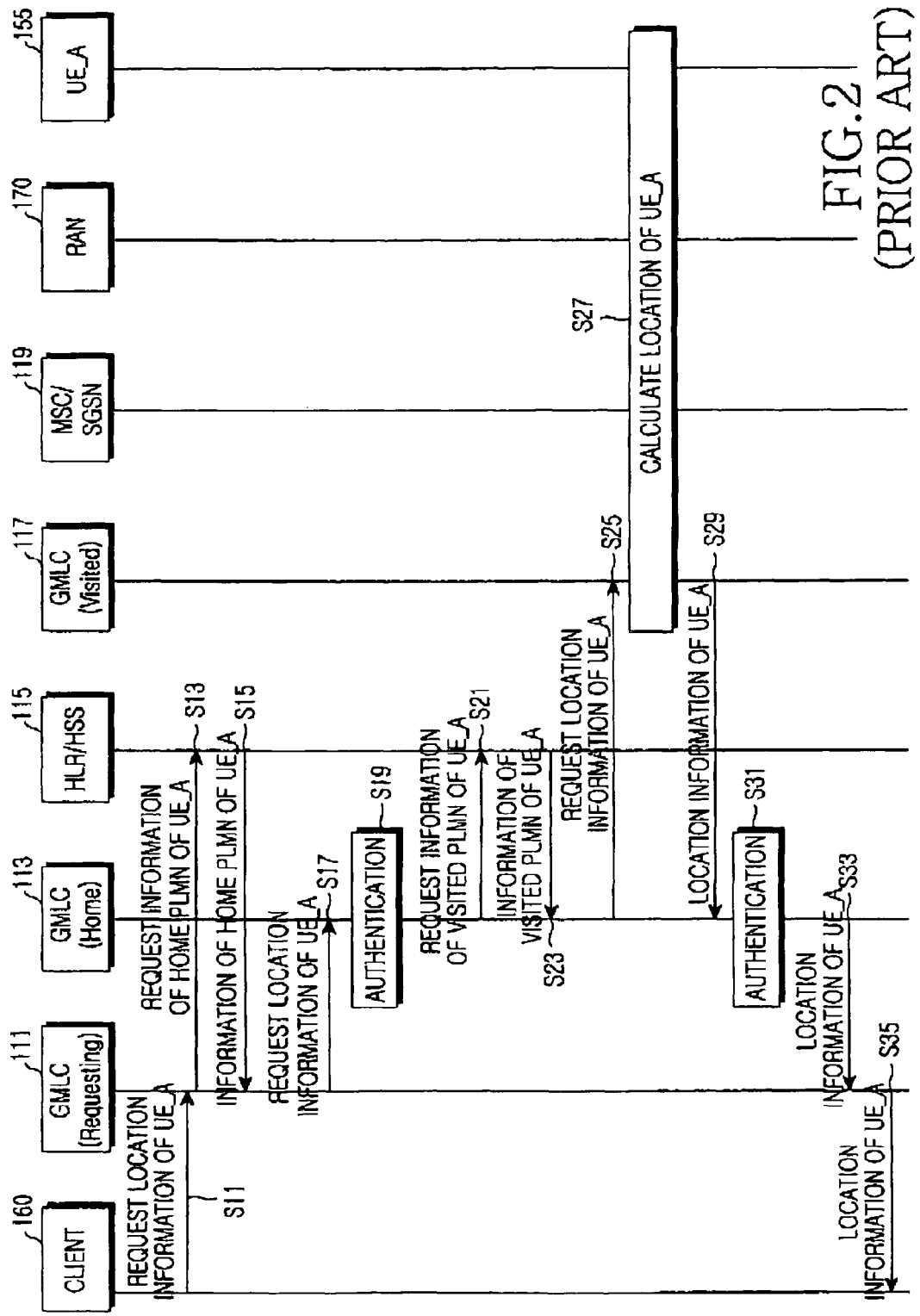
FIG. 2 is a flow diagram illustrating a conventional method for locating mobile terminals.
Figure 3:
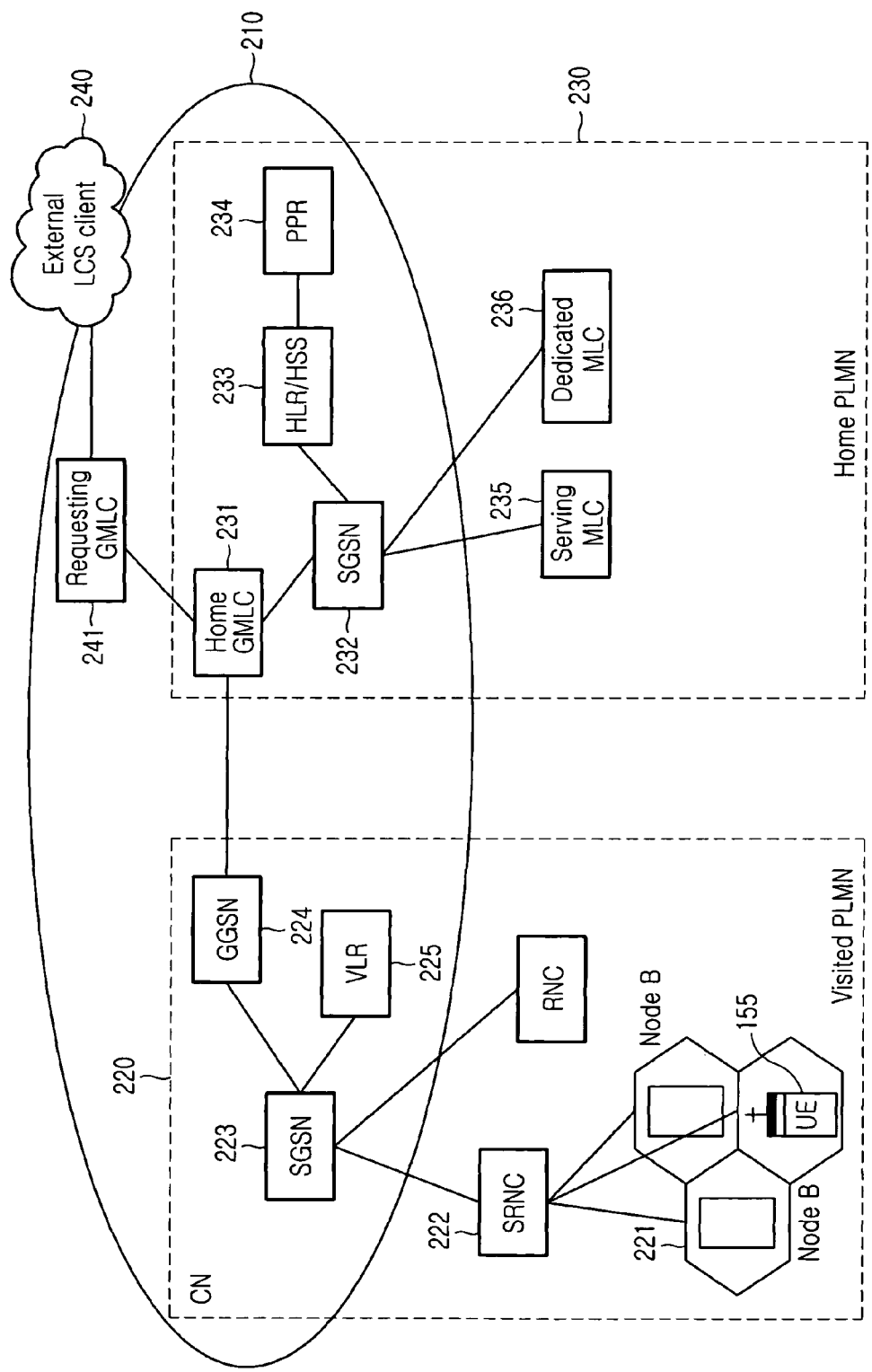
FIG. 3 is a diagram illustrating the configuration of a network for locating mobile terminals according to an embodiment of the present invention.

FIG. 3 is a diagram illustrating the configuration of a network for locating mobile terminals according to an embodiment of the present invention. This embodiment is useful particularly when a PLMN 220 visited by a target UE 155, the location of which is to be determined, supports no location service (LCS). The target UE 155 is connected to a Core Network (CN) 210 via a Radio Access Network (RAN) such as a base station (node B) 221 or an SRNC (Serving RNC) 222. A plurality of data (for example, pseudo range data acquired from a GPS satellite signal, a satellite ID, and a reference time when a GPS signal is acquired) required for location determination of the UE 155 is encapsulated with an IP address. Using routing information stored in a Visitor Location Register (VLR), the encapsulated data is transferred to a home GMLC 231 in a home PLMN 230, to which the UE 155 belongs, after passing through an SGSN 223 and a GGSN (Gateway GPRS Support Node) 224 that support a packet data service.

The home PLMN 230 needs to perform location service authentication, approval, and location calculation of the UE 155 using its internal resources. To accomplish this, the home PLMN 230 needs to include therein network components such as an SGSN 232, an HLR/HSS 233, a Privacy Profile Register (PPR) 234 and Mobile Location Centers (MLCs) such as a serving MLC 235 and dedicated MLC 236.

If an external LCS client 240 desires to measure the location of the UE 155, the external LCS client 240 requests an LCS service from the home GMLC 231 after connecting to a requesting GMLC 241 using routing information such as an IMSI, an MSISDN or an IP address.

Figure 4:
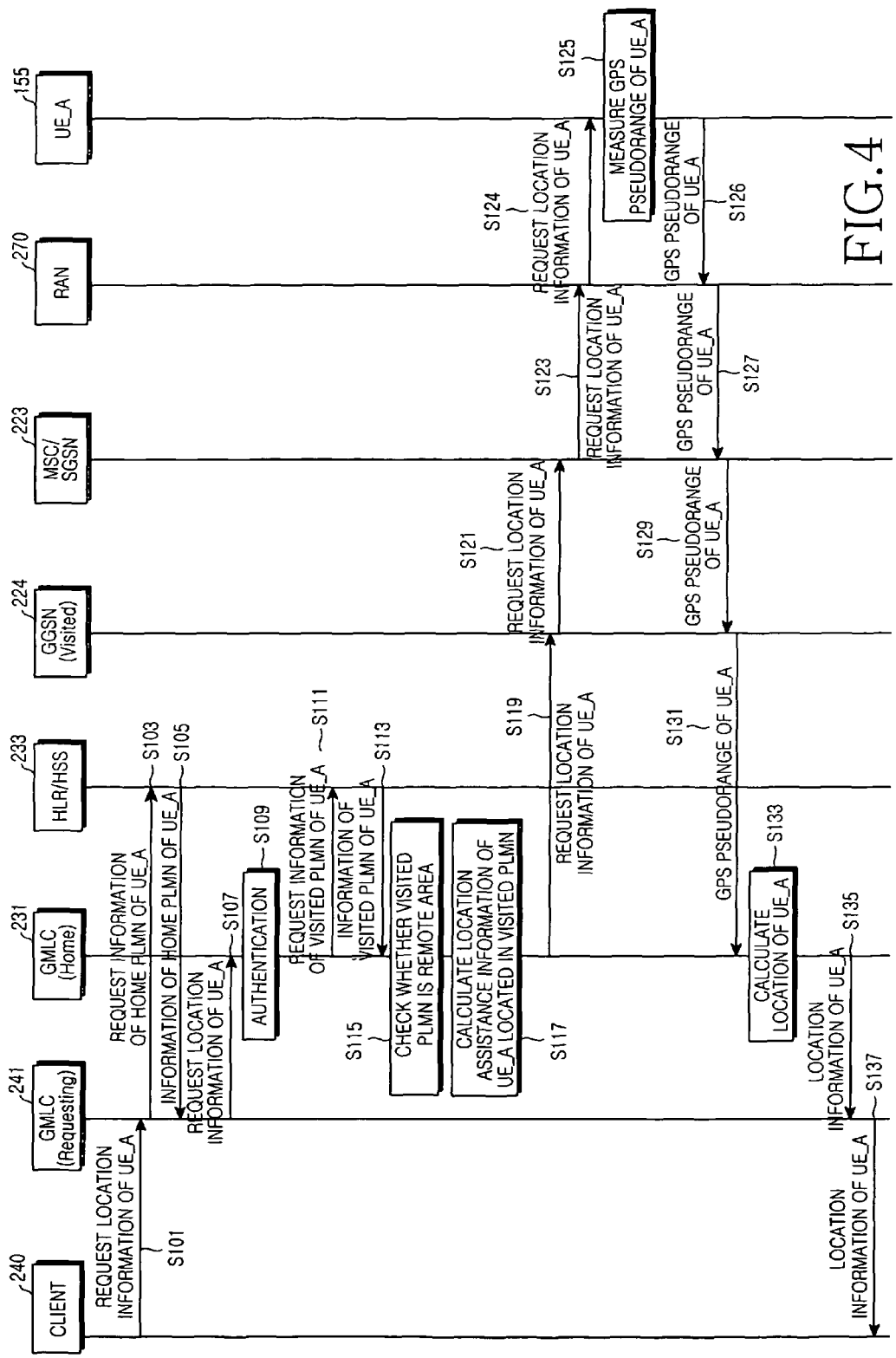
FIGS. 4 and 5 are flow diagrams illustrating a method for locating mobile terminals according to a first embodiment of the present invention.

FIG. 4 is a flow diagram illustrating a method for locating mobile terminals according to a first embodiment of the present invention. In particular, this figure illustrates an example of the location method where the location of a UE_A 155 is calculated in a UE-assisted method at the request of an external LCS client (hereinafter, referred to as a "client") 240 for location of the UE_A 155.

As shown in FIG. 4, the client 240 requests a location service (LCS) of a UE, the location of which the client 240 desires to know, from a requesting GMLC 241 connected with the client 240 (S101). That is, the client 240 requests location information of the UE_A 155 from the requesting GMLC 240. In this process, the client 240 transmits identification of the UE, the location of which it desires to know, to the requesting GMLC 241. The "requesting" GMLC 241 is a GMLC that "requests" location of the UE_A 155.

Then, using the UE identification information (for example, an IMSI or an IP address) received from the client 240, the requesting GMLC 241 requests home PLMN information (for example, routing information of a home GMLC 231) of the UE_A 155 from an HLR/HSS 233 (S103), and receives the home PLMN information from the HLR/HSS 233 (S105). As a server storing roaming information and registrant information of UEs, the HLR/HSS 233 responds to the request from the requesting GMLC 241 using the stored registrant information of the UEs. That is, in response to the request from the requesting GMLC 241, the HLR/HSS 233 provides the home PLMN information of the UE_A 155 to the requesting GMLC 241.

Then, using the routing information of the home GMLC 231 of the UE_A 155 received from the HLR/HSS 233 at step S105, the requesting GMLC 241 requests location information of the UE_A 155 from the home GMLC 231 of the UE_A 155 (S107). In response to the request from the requesting GMLC 241, the home GMLC 213 requests and receives information of a PLMN visited by the UE_A 155 from the HLR/HSS 233 (S111, S113) after performing authentication for privacy protection (S109).

In another embodiment, the steps of acquiring the routing information of the home GMLC 231 (S103 and S105), and the steps of acquiring the routing information of the UE_A 155 existing in the roaming zone (S111, S113) may be implemented in two steps; one step for simultaneously requesting routing information of home GMLC 231 and routing information of UE_A 155 existing in a roaming zone and the other step for simultaneously receiving the routing information of both the home GMLC 231 and the UE_A 155 existing in the roaming zone by the requesting GMLC 241. For example, the requesting GMLC 241 simultaneously requests both the information of the home GMLC 231 of the target UE_A 155 and the information (for example, the IP address of a visited GGNS) for routing to the visited PLMN where the UE_A 155 is located at the requested time.

After the routing information acquisition, the home GMLC 231 checks, based on the visited PLMN information, whether the visited PLMN is a remote area (S115). That is, the home GMLC 231 checks whether the visited PLMN is an area not supporting the A-GPS function. If the visited PLMN is an area not supporting the A-GPS function, the home GMLC 231 calculates location assistance information of the UE_A 155 located in the visited PLMN (S117), and transmits a message requesting location information of the UE_A 155, together with the location assistance information, to the visited GGSN 224 in the visited PLMN (S119).

At step S117, based on a cell ID received from the visited PLMN of the UE_A 155, the home GMLC 231 calculates GPS satellite orbit and geographical information of a corresponding cell where the UE_A 155 is present. Then, based on the calculation result, the home GMLC 231 calculates effective location assistance information (for example, GPS navigation parameters) to allow the UE_A 155 to effectively acquire GPS signals (UE-assisted LCS) and also to perform improved location calculation using acquired raw GPS data (UE-based LCS).

To carry out the above step S117, the home GMLC 231 preferably includes a database (DB) for allowing it to obtain geographical information of each of a plurality of PLMNs using the cell ID of each of the PLMNs. For example, using approximate location information of the visited PLMN (for example, geographical information such as "Suwon" and "Daegu" (the names of some Korean cities) managed in the HLR 233, the home PLMN 231 detects the geographical information (for example, latitude and longitude) of the visited PLMN from the database (DB) and then calculates location assistance information of the visited PLMN using the detected geographical information.

Some examples of the location assistance information calculated at step S117 can include the number of satellites, satellite IDs, GPS satellite reference time, ionospheric delay correction information, ephemeris and clock correction information, UTC (Universal Time Coordinated) offset, satellite almanac, an invisible satellite list, Doppler model coefficients, Doppler search window size, approximate geographical information of a cell of interest, and code phase-related information. These information items, together with the IP address, are encapsulated in a packet, which is then transferred to the visited GGSN 224. The visited GGSN 224 is a GGSN that belongs to the PLMN being visited by the UE_A 155.

FIG. 6A illustrates an example of the format of a message 510 transmitted from the home GMLC 231 to the GGSN 224 at the above step S119. As shown in FIG. 6a, the message 510 includes an LCS session request flag field 511, a source IP address field 512, a destination IP address field 513, a client ID field 514, a location calculation type field 515 and a location assistance information field 516.

The LCS session request flag field 511 stores a flag informing the UE_A 155 that the message 510 is a location information request message. The source IP address field 512 stores the IP address of the home GMLC 231, and the destination IP address field 513 stores the IP address of the UE_A 155. The client ID field 514 stores the ID of a client requesting the location of the UE_A 155, which is used for authentication of the request for location information of the UE_A 155. The location calculation type field 515 stores the type of location calculation. Specifically, the location calculation type field 515 stores information indicating whether the location calculation type is "UE-based", in which the UE_A 155 itself carries out the location calculation of the UE_A 155, or "UE-assisted type", in which the home GMLC 231 calculates the location of the UE_A 155 based on a GPS pseudorange measured by the UE_A 155. In the example of FIG. 4, since the location calculation type is UE-assisted, the location calculation type field 515 of the message transmitted at step S119 stores information indicating that the location calculation type is UE-assisted.

The location assistance information field 516 stores location assistance information of the UE_A 155 measured by the home GMLC 231. This field may also store location assistance information selected based on characteristics of the UE_A 155 that are previously determined by the home GMLC 231. When receiving the message 510 configured as shown in FIG. 6A from the home GMLC 231 at step S119, the GGSN 224 transfers the message to the UE_A 155 via the MSC/SGSN 223 and the Radio Access Network (RAN) 270 (S121, S123 and S124). Here, depending on available network resources or traffic states among location assistance information stored in the home GMLC 231, the home GMLC 231 may transfer only location assistance information for acquiring an initial GPS signal to the UE_A 155, and may use the remaining available location assistance information in location calculation when a pseudorange measurement is received from the UE_A 155.

The message transfer from the home GMLC 231 to the RAN 270 is performed in the same manner as packet transmission in the general GPRS support network. Specifically, the message 510 is converted into packet data (e.g., a PDP Packet Data Protocol PDU Protocol Data Unit), and the packet data is then encapsulated according to a GPRS Tunneling Protocol (GTP). The encapsulated packet data is transferred to the RAN 270 along a transmission path tunneled to the RAN 270, which is then transferred from the RAN 270 to an upper application layer of the UE_A 155 through the Packet Data Convergence Protocol (PDCP).

Then, the UE_A 155 checks location calculation-type included in the message 510, and performs processing according to the location calculation type. In the example of FIG. 4, since the location calculation type is UE-assisted, the UE_A 155 measures a GPS pseudorange of the UE_A 155 using the location assistance information included in the message 510 (S125). Then, the UE_A 155 transfers the calculation result to the home GMLC 231 via the RAN 270, the MSC/SGGN 223 and the visited GGSN 224 (S126, S127, S129 and S131). Here, the GPS pseudorange is routed and transferred to the home GMLC 231 after being encapsulated with the IP address of the home GMLC 231. FIG. 6B illustrates the format of a message carrying the location information of the UE_A 155.

As shown in FIG. 6B, a message 520 transmitted from the UE_A 155 to the GMLC 231 includes an LCS response flag field 521, a source IP address (i.e., the IP address of the UE_A 155) field 522, a destination IP address (i.e., the IP address of the home GMLC 231) field 523, a client ID field 524, a location calculation type field 525 and a GPS pseudorange (of the UE_A 155) field 526. A detailed description of data stored in these fields is omitted herein since it is similar to the description of FIG. 6A.

When receiving the GPS pseudorange of the UE_A 155, the home GMLC 231 calculates the location of the UE_A 155 using the GPS pseudorange (S133), and transfers the calculation result to the client 240 via the requesting GMLC 241.

Figure 5:
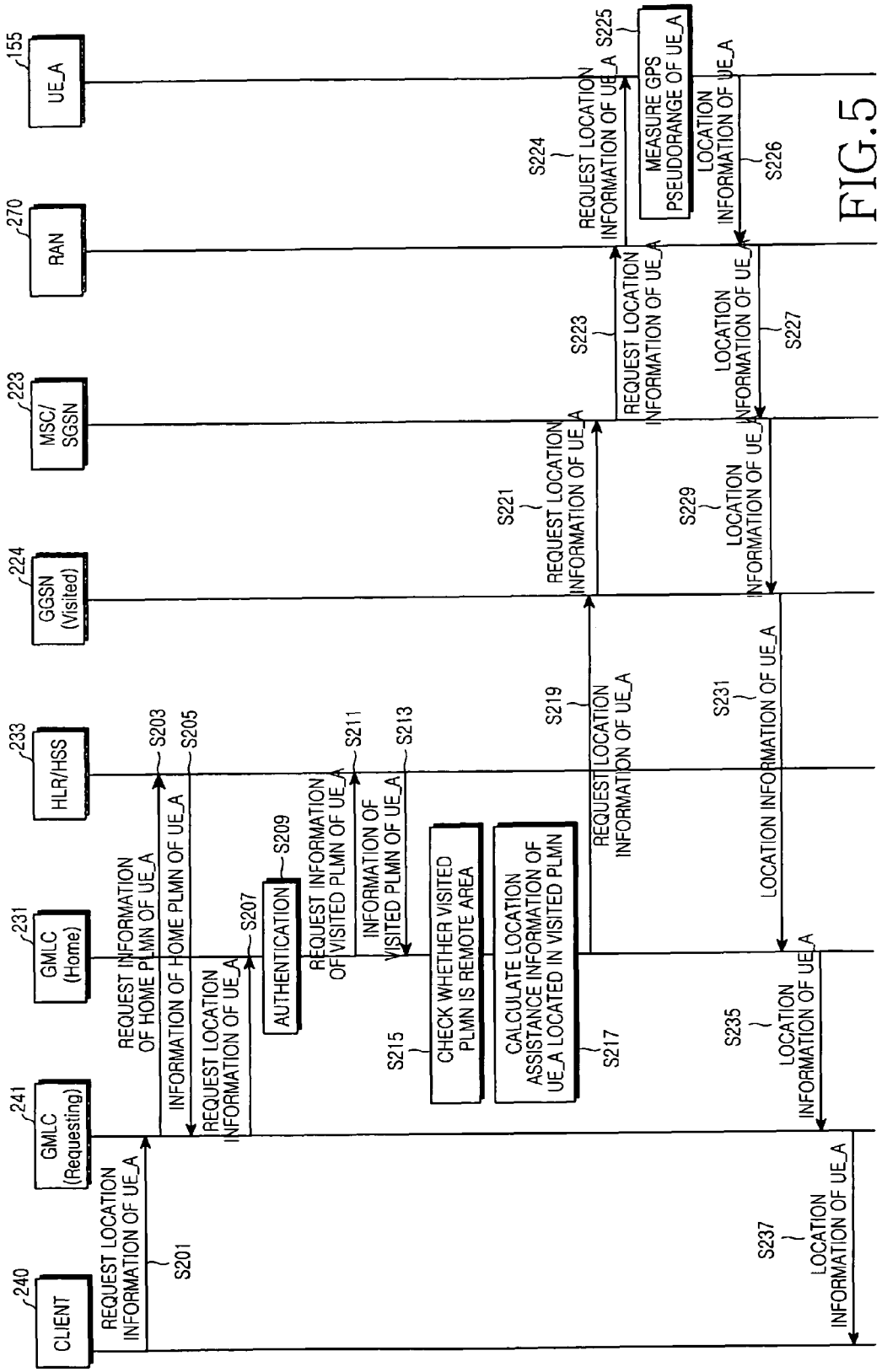

FIG. 5 is a process flow diagram showing a method for locating mobile terminals according to a first embodiment of the present invention. In particular, this figure shows an example of the location method where the location of the UE_A 155 is calculated in a UE-based method at the request of an external LCS client (hereinafter, referred to as a "client") 240 for location of the UE_A 155.

Steps S201 to S224 of FIG. 5 are similar to steps S101 to S124 of FIG. 4, and thus a detailed description of steps S201 to S224 will be omitted. However, since the location calculation type is UE-based in the example of FIG. 5, part of the message 510 transferred from the GMLC 231 to the UE_A 155 at steps S219 to S224 is different from that of FIG. 4. That is, the location calculation type field 515 of the message 510 of FIG. 5 stores information indicating that the location calculation type is UE-based. The method for transferring the message from the home GMLC 231 to the RAN 270 at steps S219 to S224 is similar to that of FIG. 4 described above, and thus a detailed description thereof will be omitted.

Then, the UE_A 155 checks location calculation type included in the message 510, and performs processing according to the location calculation type. In the example of FIG. 5, since the location calculation type is UE-based, the UE-A 155 measures a GPS pseudorange of the UE_A 155 using the location assistance information included in the message 510, and calculates the location of the UE_A 155 based on the measured GPS pseudorange (S225). Then, the UE_A 155 transfers the calculation result to the client 240 via the RAN 270, the MSC/SGGN 223 and the visited GGSN 224, the home GMLC 231 and the requesting GMLC 241 (S226, S227, S229, S231, S235 and S237). Here, the location information of the UE_A 155 is routed and transferred to the home GMLC 231 after being encapsulated with the IP address of the home GMLC 231. FIG. 6C illustrates the format of a message carrying the location information of the UE_A 155.

As shown in FIG. 6C, a message 530 transmitted from the UE_A 155 to the GMLC 231 includes an LCS response flag field 531, a source IP address (i.e., the LP address of the UE_A 155) field 532, a destination IP address (i.e., the IP address of the home GMLC 231) field 533, a client ID field 534, a location calculation type field 535 and a GPS location information (of the UE_A 155) field 536. A detailed description of data stored in these fields is omitted herein since it is similar to the description of FIG. 6A.

Figure 7:
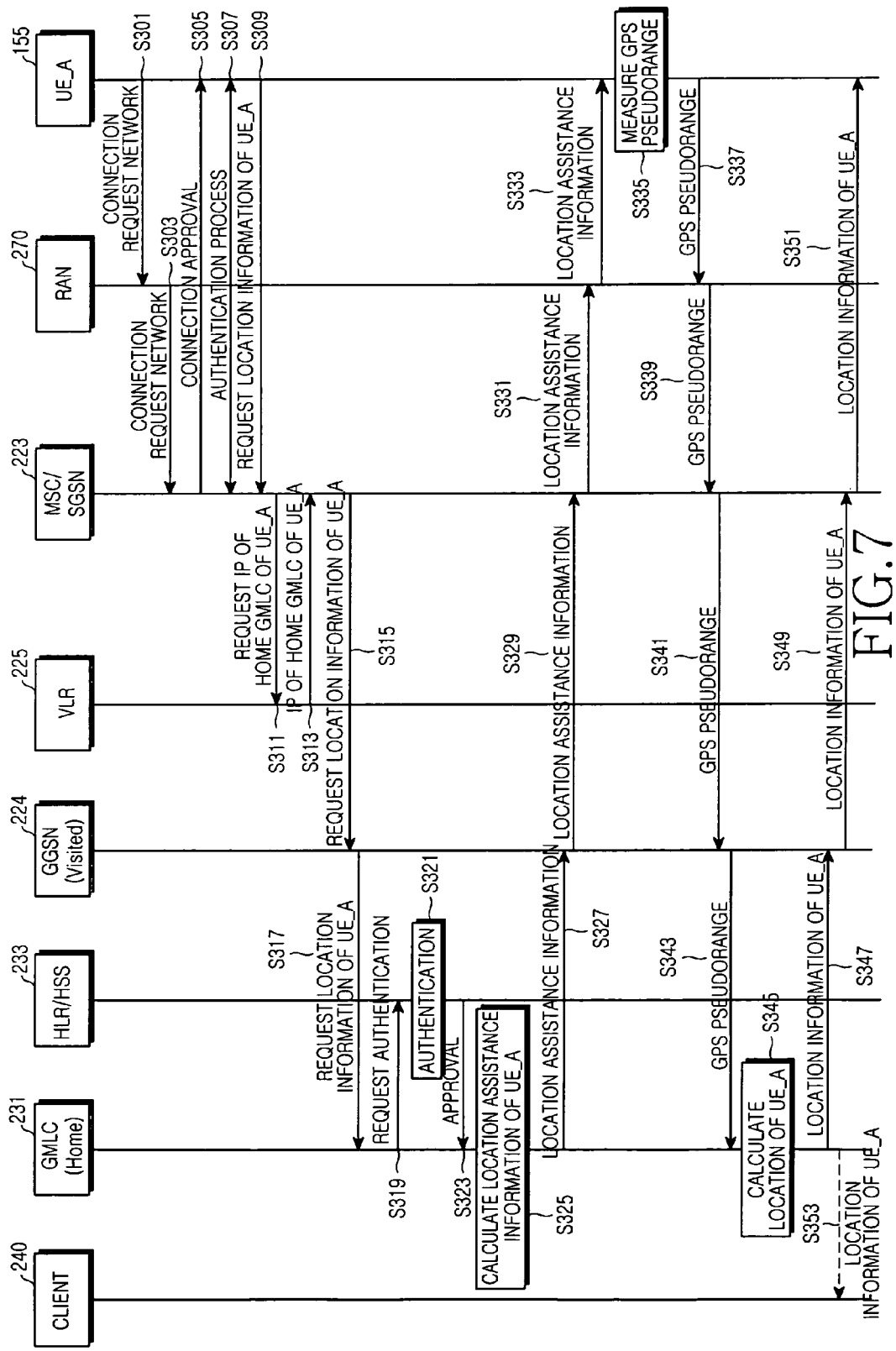
FIGS. 7 and 8 are flow diagrams illustrating a method for locating mobile terminals according to a second embodiment of the present invention.

FIG. 7 is a flow diagram showing a method for locating mobile terminals according to a second embodiment of the present invention. In particular, this figure illustrates an example of the location method where the location of a UE_A 155 is calculated in a UE-assisted method at the request of the UE_A 155 for location of the UE_A 155 located in an area (called a "remote area") not supporting the A-GPS function. Here, the UE_A 155 is a target UE, the location of which is to be determined. The UE_A 155 needs to request the location thereof in a remote area as in this example in the case where, in an area not supporting the A-GPS function, the UE_A 155 desires to independently know its location information to use an LCS service database stored in the UE_A 155 or to utilize travel or geographic information using an LCS service provided from the PLMN.

As shown in FIG. 7, the UE_A 155 first needs to connect to a network to request its location. To connect to the network, the UE_A 155 requests network connection from an MSC/SGSN 223 via a Radio Access Network (RAN) 270 (S301, S303), and receives, as a response to the request, network connection approval from the MSC/SGSN 223 (S305), and then connects to the network via an authentication process with the MSC/SGSN 223 (S307). If the UE_A 155 has already been connected to the network, steps S301 to A307 can be omitted.

When connected to the network, the UE_A 155 requests location information of the UE_A 155 from the MSC/SGSN 223 via the RAN 270 (S309). Then, after determining that a PLMN being visited by the UE_A 155 itself cannot provide location information (for example, it cannot support the A-GPS function), the SGSN 223 receives routing information (for example, the IP address of a home GMLC 231) of a home PLMN of the UE_A 155 from the Visitor Location Register (VLR) 225 (S311, S313), and then transmits a message requesting location information of the UE_A 155 to a GGSN 224 of the visited PLMN (S315). Here, the SGSN 223 transmits the location information request message, together with the IP address of the home GMLC 231, to the GGSN 224.

FIG. 9A illustrates the format of a location information request message 610 to be transferred to the GGSN 224. As shown in FIG. 9A, the location information request message 610 includes an LCS session request flag field 611, a UE_A ID (for example, an IMSI and an IP address of the UE_A 155) field 612, a cell ID field 613, and a location calculation type field 614. The location information request message 610 may further include an expiration time information field 616 indicating an expiration time of the request information and a location QoS field 615 to guarantee the quality of service.

After receiving the UE_A location information request message 610 as shown in FIG. 9a, together with the IP address of the home GMLC 231, from the MSC/SGSN 223 at step S315, the GGSN 224 requests the location of the UE_A 155 from the home GMLC 231 using the IP address of the home GMLC 231 (S317). That is, the GGSN 224 transfers the location information request message 610 to the home GMLC 231. Here, as shown in FIG. 9A, the location information request message 610 includes cell information (for example, a cell ID) of a cell being visited by the UE_A 155, which is necessary to support the remote A-GPS function.

After receiving the location information request message 610, the home GMLC 231 requests authentication of the service from the HLR/HSS 233 (S319), and in response to this request, the HLR/HSS 233 performs authentication of the service and processing for privacy protection (S321), and then transfers the authentication (e.g., an approval) result to the home GMLC 231 (S323).

If the home GMLC 231 receives approval of the service at steps S319 to S323, the home GMLC 231 calculates location assistance information of the UE_A 115 (S325), and then transmits the calculated location assistance information to the visited GGSN 224 of the visited PLMN (S327).

At step S325, based on a cell ID received from the visited PLMN of the UE_A 155, the home GMLC 231 calculates GPS satellite orbit and geographical information of a corresponding cell where the UE_A 155 is present. Then, based on the calculation result, the home GMLC 231 calculates effective location assistance information (for example, GPS navigation parameters) to allow the UE_A 155 to effectively acquire GPS signals (UE-assisted LCS) and also to perform improved location calculation using acquired raw GPS data (UE-based LCS).

To carry out the above step S325, the home GMLC 231 preferably includes a database (DB) for allowing it to obtain geographical information of each of a plurality of PLMNs using the cell ID of each of the PLMNs. For example, using the cell ID of the visited PLMN, the home PLMN 231 detects the geographical information of the visited PLMN from the database (DB) and then calculates location assistance information of the UE_A 155 located in the visited PLMN using the detected geographical information.

Some examples of the location assistance information calculated at step S325 are the number of satellites, satellite IDs, GPS satellite reference time, ionospheric delay correction information, ephemeris and clock correction information, UTC (Universal Time Coordinated) offset, satellite almanac, an invisible satellite list, Doppler model coefficients, Doppler search window size, approximate geographical information of a cell of interest, and code phase-related information. After receiving the location assistance information at step S327, the GGSN 224 transfers the location assistance information to the UE_A 155 via the MSC/SGSN 223 and the RAN 270 (S329, S331 and S333). Here, only location assistance information for acquiring an initial GPS signal may be transferred to the UE_A 155, and the remaining available location assistance information may be used in location calculation when a pseudorange measurement is received from the UE_A 155. The location assistance information transferred from the home GMLC 231 to the UE_A 155 is in the form of a message 620 as shown in FIG. 9B. As shown in FIG. 9B, the location assistance information transfer message 620 includes a source (home GMLC) IP address field 621, a destination (UE_A) IP address field 622, a location calculation type field 623 and a location assistance information field 624. In the example of FIG. 7, since the location calculation type is UE-assisted, the location calculation type field 623 stores information indicating that the location calculation type is UE-assisted.

After receiving the location assistance information at step S333, the UE_A 155 measures a GPS pseudorange of the UE_A 155 using the location assistance information (S335). The UE_A 155 then transfers the measured GPS pseudorange to the home GMLC 231 via the RAN 270, the MSC/SGGN 223 and the visited GGSN 224 (S337, S339, S341 and S343). The GPS pseudorange is routed and transferred to the home GMLC 231 after being encapsulated with the IP address of the home GMLC 231.

FIG. 9C shows an example of a message 630 for transferring the GPS pseudorange to the home GMLC 231. As shown in FIG. 9C, the GPS pseudorange transfer message 630 includes a source (UE_A) IP address field 631, a destination (home GMLC) IP address field 632, a location calculation type field 633 and a UE_A GPS pseudorange field 634.

The message transfer at steps S337 to S343 is preferably performed in a packet data tunneling mode based on the GTP protocol as in the message transfer from the home GMLC 231 to the RAN 270 in FIG. 4. After receiving the GPS pseudorange of the UE_A 155 at steps S337 to S343, the home GMLC 231 calculates the location of the UE_A 155 using the received GPS pseudorange (S345), and transfers the calculation result to the UE_A 155 via the visited GGSN 224 and the MSC/SGSN 223 (S347, S349 and S351). The home GMLC 231 may also transfer the calculation result (for example, location information of the UE_A) to the client 240 (S353).

FIG. 9D shows an example of a message 640 for transferring the location information of the UE_A 155. As shown in FIG. 9D, the UE_A location information transfer message 640 includes a source (home GMLC) IP address field 641, a destination (UE_A) IP address 642, a location calculation type field 643 and a UE_A location information field 644.

Figure 8:
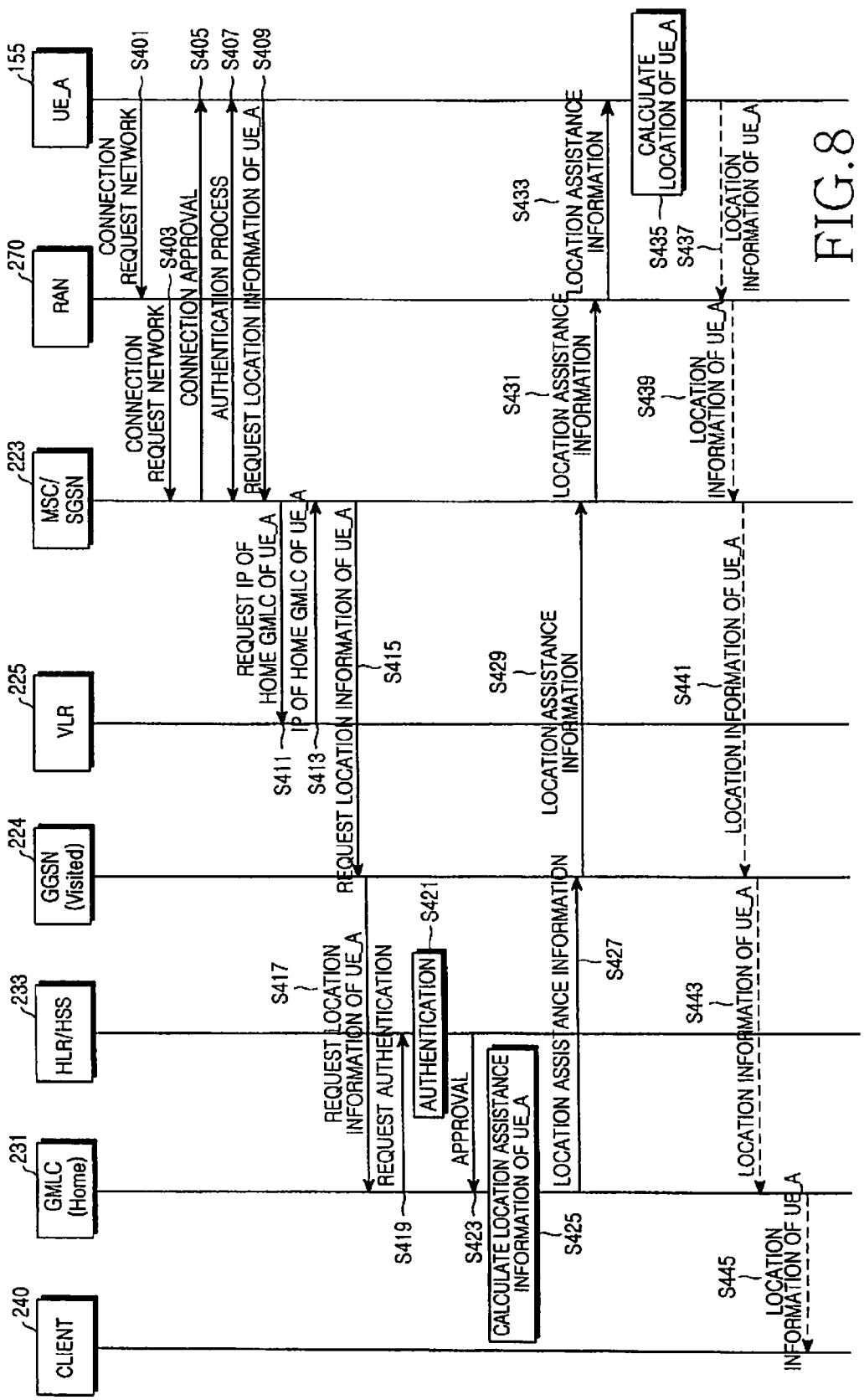

FIG. 8 is a flow diagram showing a method for locating mobile terminals according to a second embodiment of the present invention. In particular, this figure illustrates an example of the location method where the location of a UE_A 155 is calculated in a UE-based method at the request of the UE_A 155 for location of the UE_A 155 located in an area (called a "remote area") not supporting the A-GPS function. As in this example, the UE_A 155 needs to request the location thereof in a remote area in such a case as described above at the beginning of the description of FIG. 7.

Steps S401 to S433 of FIG. 8 are similar to steps S301 to S333 of FIG. 7, and thus a detailed description of steps S401 to S433 will be omitted. However, since the location calculation type is UE-based in the example of FIG. 8, part of the message 610 transferred at steps S409, S415 and S417 is different from that of FIG. 7. That is, the location calculation type field 623 of the message 610 of FIG. 8 stores information indicating that the location calculation type is UE-based. The method for transferring the message 610 is similar to that of FIG. 7 described above, and thus a detailed description thereof will be omitted.

After receiving the location assistance information at step S433, the UE_A 155 measures the GPS pseudorange of the UE_A 155 using the location assistance information and then calculates the location of the UE_A 155 using the measured GPS pseudorange (S435). Then, the UE_A 155 transfers the calculation result to the client 240 via the RAN 270, the MSC/SGGN 223, the visited GGSN 224 and the home GMLC 231 (S437, S439, S441, S443 and S445). The location information of the UE_A 155 is routed and transferred to the home GMLC 231 after being encapsulated with the IP address of the home GMLC. FIG. 9E shows an example of a message 650 for transferring the location information of the UE_A 155. As shown in FIG. 9E, the UE_A location information transfer message 650 includes a source (UE_A) IP address field 651, a destination (home GMLC) IP address 652, a location calculation type field 653 and a UE_A location information field 654.

In the first and second embodiments of the present invention, the UE_A 155 is an IP support terminal that can perform both encapsulation and decapsulation.

As apparent from the above description, the present invention provides a method for locating mobile terminals that has the following features and advantages. First, location information of a mobile terminal can be obtained irrespective of the area or communication network where the mobile terminal is located. It is thus possible to locate a mobile terminal in an area where no location assistance information is provided. In addition, location assistance information of a mobile terminal, the location of which is to be determined, is produced based on location information of a home communication network of the mobile terminal received through a packet network, thereby obtaining effective and accurate location information. Further, continuity and integrity of a location service can be provided even when the mobile terminal is roaming.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. A home Public Land Mobile Network (PLMN) method for locating mobile terminals, comprising the steps of:
   a) receiving a request message of location service for a target terminal which is roaming;
   b) checking information of a visited PLMN visited by the target terminal, in response to the request message of location service;
   c) determining if the visited PLMN provides location assistance information using the checked information of the visited PLMN;
   d) if the visited PLMN does not provide location assistance information, calculating by the home PLMN, using information corresponding to a cell ID of the target terminal in the visited PLMN, location assistance information for performing Network Assisted Global Positioning System (A-GPS) positioning of the target terminal; and
   e) transferring the location assistance information to the target terminal.

2. The method according to claim 1, further comprising the step of:
  f) calculating, by the home PLMN, the location of the target terminal using a GPS pseudorange of the target terminal, wherein the GPS pseudorange is measured in the target terminal using the location assistance information.

3. The method according to claim 1, further comprising the step of:
  g) receiving, by the home PLMN, calculated location information from the target terminal, wherein the calculated location information is calculated using a GPS pseudorange measured by the target terminal and the GPS pseudorange is measured in the target terminal using the location assistance information.

4. The method according to claim 1, wherein step b) includes the step of receiving and checking an IP address of a Gateway GPRS Support Node (GGSN) of the visited PLMN of the target terminal from a server for storing registrant and roaming information of mobile terminals.

5. The method according to claim 1, wherein step d) includes the step of calculating GPS satellite orbit and geographical information of the visited PLMN visited by the target terminal, and then calculating valid location assistance information using the calculation result.

6. The method according to claim 1, wherein at step d), the home PLMN, including a database (DB) for allowing the home PLMN to obtain geographical information of each of a plurality of PLMNs using a cell ID of each of the PLMNs, detects geographical information of the visited PLMN from the database using the cell ID of the target terminal in the visited PLMN, and calculates location assistance information of the visited PLMN using the detected geographical information.

7. The method according to claim 1, wherein said step e) includes the step of transferring only location assistance information for acquiring an initial GPS signal, depending on available network resources or traffic states.

8. The method according to claim 1, wherein step e) includes the step of encapsulating and transmitting the location assistance information, IP information of the home PLMN and the target terminal, and a location information request instruction.

9. A home Public Land Mobile Network (PLMN) method for locating mobile terminals, comprising the steps of:
  a) receiving a request message of location service for a target terminal from a visited PLMN which the target terminal is roaming in, the request message including at least one a Cell ID;
  b) checking information of the visited PLMN visited by the target terminal, which is roaming, in response to the request message of location service;
  c) determining if the visited PLMN visited by the target terminal provides location assistance information;
  d) if the visited PLMN doesn't provide location assistance information, receiving information corresponding to the cell ID of the target terminal from the visited PLMN at the home PLMN, and calculating by the home PLMN, using the information corresponding to the cell ID of the target terminal, the location assistance information for performing Network Assisted Global Positioning System (A-GPS) positioning of the target terminal; and
  e) transferring the location assistance information to the target terminal.

10. The method according to claim 9, further comprising the steps of:
  f) receiving, by the visited PLMN, calculated location information from a home PLMN, wherein the calculated location information is calculated in the home PLMN using a GPS pseudorange measured by the target terminal and the GPS pseudorange is measured in the target terminal using the location assistance information; and
  g) transferring the calculated location information to a client terminal or the target terminal.

11. The method according to claim 9, further comprising the steps of
  g) receiving, by the visited PLMN, calculated location information from the target terminal, wherein the calculated location information is calculated in the target terminal; and
  h) transferring the calculated location information to a client terminal.

12. The method according to claim 9, wherein at step b), a Serving GPRS (General Packet Radio Service) Support Node (SGSN) of the visited PLMN receives and checks an IP address of a Gateway Mobile Location Center (GMLC) of a home PLMN from a Visitor Location Register (VLR).

13. The method according to claim 9, wherein step d) includes the step of calculating GPS satellite orbit and geographical information of the visited PLMN visited by the target terminal, and then calculating valid location assistance information using the calculation result.

14. The method according to claim 9, wherein at step d), a home PLMN, including a database (DB) for allowing the home PLMN to obtain geographical information of each of a plurality of PLMNs using a cell ID of each of the PLMNs, detects geographical information of the visited PLMN from the database using the cell ID of the visited PLMN, and calculates location assistance information of the visited PLMN using the detected geographical information.

15. The method according to claim 9, wherein said step e) includes the step of transferring location assistance information for acquiring an initial GPS signal, depending on available network resources or traffic states.

16. The method according to claim 9, wherein step e) includes the step of encapsulating and transmitting the location assistance information, IP information of a home PLMN and the target terminal, and a location information request instruction.

17. The method according to claim 1, wherein the location assistance information is transmitted to the target terminal through the visited PLMN.

18. The method according to claim 1, wherein the information corresponding to the cell ID of the target terminal in the visited PLMN, the information is at least one of a GPS satellite orbit and a geographical information of a corresponding cell where the target terminal is located.

19. The method according to claim 1, wherein in the step of receiving a request message of location service for a target terminal which is roaming, the home PLMN receives the request message from the target terminal.

20. The method according to claim 19, wherein the request message includes at least a Cell ID of the target terminal.

21. The method according to claim 1, further comprising the steps of:
  receiving routing information of the target terminal; and
  requesting information of the visited PLMN from the visited PLMN, the information including an IP address of a Gateway GPRS Support Node (GGSN) of the visited PLMN of the target terminal.

22. The method according to claim 1, further comprising the steps of:

receiving, by the home PLMN, the information corresponding to a cell ID of the target terminal from the visited PLMN.

23. The method according to claim 9, wherein the information corresponding to the cell ID of the target terminal in the visited PLMN, includes at least one of a GPS satellite orbit and a geographical information of a corresponding cell where the target terminal is located.

24. The method according to claim 9, further comprising the steps of:

receiving routing information of the target terminal; and requesting information of the visited PLMN from the visited PLMN, the information including an IP address of a Gateway GPRS Support Node (GGSN) of the visited PLMN of the target terminal.

* * * * *